United States Patent [19]

Seitzer

[11] 3,920,804

[45] Nov. 18, 1975

[54] HYDROGEN PROCESS

[75] Inventor: Walter H. Seitzer, West Chester, Pa.

[73] Assignee: Sun Ventures, Inc., St. Davids, Pa.

[22] Filed: Sept. 16, 1974

[21] Appl. No.: 506,495

Related U.S. Application Data

[63] Continuation-in-part of Ser. No. 404,963, Oct. 10, 1973, abandoned.

[52] U.S. Cl. ............... 423/650; 423/437; 423/655
[51] Int. Cl.² ...................... C01B 1/16; C01B 2/06
[58] Field of Search ........... 423/650, 651, 652, 655, 423/437

[56] References Cited
UNITED STATES PATENTS

| | | | |
|---|---|---|---|
| 1,252,033 | 1/1918 | Rose | 423/650 UX |
| 1,819,732 | 8/1931 | Burwell | 423/650 |
| 1,904,592 | 4/1933 | Young et al. | 423/652 |
| 1,905,028 | 4/1933 | Andrews et al. | 423/650 UX |
| 2,552,737 | 5/1951 | Rees | 252/373 X |
| 2,772,149 | 11/1956 | Garbo | 423/650 X |
| 3,097,081 | 7/1963 | Eastman et al. | 423/650 X |
| 3,097,082 | 7/1963 | Guptill, Jr. | 423/650 X |
| 3,334,971 | 8/1967 | James et al. | 423/652 X |
| 3,532,467 | 10/1970 | Smith et al. | 423/650 |
| 3,567,381 | 3/1971 | Bearon et al. | 423/650 |

*Primary Examiner*—Edward Stern
*Attorney, Agent, or Firm*—George L. Church; Donald R. Johnson; Paul Lipsitz

[57] ABSTRACT

In the process of making hydrogen by reforming hydrocarbons with steam, the improvement which comprises preheating the steam to a temperature of at least about 3,600°F. to its introduction to the reforming reactor.

4 Claims, No Drawings

HYDROGEN PROCESS

BACKGROUND OF THE INVENTION

This is a continuation-in-part of my application Ser. No. 404,963; filed Oct. 10, 1973 and now abandoned.

A commercial process for the production of hydrogen involves two steps. The first step is the steam reforming at a temperature of about 2,000°F to 2,500°F of a hydrocarbon (e.g. methane, naphtha, hydrocarbon oils, etc.) to give a wet gas consisting mainly of carbon monoxide and hydrogen. This gas is then reacted with steam at a lower temperature to shift the carbon monoxide to carbon dioxide and hydrogen and separation of the $CO_2$ yields a product hydrogen stream.

The first step steam hydrocarbon reaction is highly endothermic and in order to supply the demand for heat, particularly when heavy hydrocarbon oils are used, it is customary to introduce oxygen to the system which gives off heat during combustion with hydrocarbon. This technique is not entirely satisfactory, however, because the oxygen is costly and also causes an increase in the ratio of CO to hydrogen. The increased amount of carbon oxides makes necessary larger shift reactors and $CO_2$ removal facilities in the second step of the process and thus further increases cost and reduces efficiency of the hydrogen making process.

It has now been found that the heat demand of the steam-hydrocarbon reforming step can be supplied without introducing oxygen or other extraneous matter into the system and without adversely affecting the ratio of carbon oxides to hydrogen. In accord with the invention hydrocarbons are reformed with steam by preheating the steam to a temperature of at least about 3,600°F and employing this very high temperature steam for the process.

The reforming process is carried out in the conventional manner with or without catalysts and reference is made to the disclosure of U.S. Pat. Nos. 2,699,986 (Buell et al., issued Jan. 18, 1955, assigned to Phillips Petroleum Co.,) and 3,514,260 (Baillie, issued May 26, 1970, assigned to Sun Oil Co.,) for details of such processes. It will be understood that after carrying out the steam reforming step, the CO in the product stream is shifted in the usual manner and a hydrogen product stream is obtained after removal of the $CO_2$. All of these steps are known in the art.

The very high temperature steam may be obtained by any of the known steam heating methods, as for example by blowing steam over the hot bricks of a refactory furnace fired with an oil-air flame. As indicated, a temperature of at least about 3,600°F. is required, but higher temperatures are, of course, useful, but for practical purposes will not exceed about 4,500°F.

The hydrocarbon materials useful in the process will range from methane to heavier petroleum oil fractions and the process will preferably be used with the latter heavier oils such as heavy gas oils, (a liquid petroleum fraction boiling at about 800° to about 1,000°F.), residuum oils, and crude oil.

In order to further illustrate the process the following comparative examples are given:

EXAMPLE 1

A heavy catalytic gas oil with a hydrogen/carbon ratio of 1.53 was fed into a reactor together with steam heated to 3,632°F. A 3/1 mole ratio of steam/carbon was sufficient to maintain the reactor temperature at 2,156°F. After being dried, the product gas analyzed as follows: $\%H_2=64.1$; $\%CO=23.3$; $\%CO_2=9.7$; $\%CH_4=2.9$. In the subsequent shifting-scrubbing, for every 100 parts of hydrogen in the ultimate product 27 parts of CO must be shifted and 38 parts of $CO_2$ must be removed.

EXAMPLE 2

The corresponding conventional type reaction using $O_2$ (65 lbs. per 100 lbs. hydrocarbon) instead of preheated steam as in Example 1 gave a product gas which analyzed as follows: $\%H_2=57.5$; $\%CO=23.3$; $\%CO_2=15.8$; $\%CH_4=3.4$. Conversion of this gas to hydrogen requires the shifting of 29 parts CO/100 parts hydrogen and the removal of 48 parts of $CO_2$. Thus, for an equal-size hydrogen plant the conventional partial oxidation process, when compared to the hot steam reforming of this invention, requires an 8 percent larger CO-shift capacity and a 28 percent larger $CO_2$-removal facility. Thus, it is clear that the process of the invention makes a significant contribution to the art.

The invention claimed is:

1. A two step process for producing hydrogen which consists of a first step of making a wet gas consisting mainly of a mixture of hydrogen and CO by reacting steam heated to a temperature of at least 3,600°F. and not exceeding 4,500°F. in the absence of added oxygen with a hydrocarbon selected from the group of heavy gas oil, residuum oil and crude oil, a second step of shifting the CO in the product stream of said first step to $CO_2$ and hydrogen, and separating $CO_2$ to yield a hydrogen product stream.

2. The process of claim 1 where the hydrocarbon oil is a heavy gas oil.

3. The process of claim 1 where the hydrocarbon is a residuum oil.

4. The process of claim 3 where the hydrocarbon is a catalytic gas oil.

* * * * *